(12) United States Patent
Ioannidis et al.

(10) Patent No.: US 6,507,840 B1
(45) Date of Patent: Jan. 14, 2003

(54) HISTOGRAM-BASED APPROXIMATION OF SET-VALUED QUERY-ANSWERS

(75) Inventors: Yannis E. Ioannidis, Athens (GR); Viswanath Poosala, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/467,963

(22) Filed: Dec. 21, 1999

(51) Int. Cl.[7] .............................................. G06F 17/30
(52) U.S. Cl. .......................................................... 707/4
(58) Field of Search ............................. 707/2, 4, 7, 10, 707/102, 104.1

(56) References Cited

U.S. PATENT DOCUMENTS

| | | | |
|---|---|---|---|
| 5,978,788 A | * | 11/1999 | Castelli et al. ................. 707/2 |
| 6,205,441 B1 | * | 3/2001 | Al-Omari et al. ............... 707/2 |
| 6,263,345 B1 | * | 7/2001 | Farrar et al. ................. 707/104 |
| 6,278,989 B1 | * | 8/2001 | Chaudhuri et al. ............. 707/2 |

OTHER PUBLICATIONS

Yannis E. Ioannidis, Viswanath Poosala, Histogram–Based Approximation of Set–Valued Query Answers; Edinburgh, Scotland, 1999.

* cited by examiner

*Primary Examiner*—Diane D. Mizrahi
(74) *Attorney, Agent, or Firm*—Morgan & Finnegan

(57) ABSTRACT

A method for generating an approximate answer in response to a query to a database in which an SQL query Q for operating on a relation R in a database is received. Relation R has an associated histogram H. The SQL query Q is translated to be a query Q' for operating on histogram H. Translated query Q' is executed on histogram H for obtaining a result histogram. The result histogram is expanded into a relation having tuples containing approximate attribute values.

14 Claims, 11 Drawing Sheets

ORIGINAL QUERY

TRANSLATED QUERY

HISTOGRAM-BASED APPROXIMATION OF SET-VALUED QUERY-ANSWERS

BACKGROUND OF THE INVENTION

1. Field of the Invention

The present invention relates to the field of databases. More particularly, the present invention relates to a method for generating histogram-based approximations in response to complex queries to a database.

2. Description of the Related Art

Extremely complex queries are posed to Database Management Systems (DBMSs) through software applications, such as decision support applications and experiment management applications. Given the exploratory nature of such queries, many of the queries require a significant amount of time to execute and then produce results that may be of no particular interest, even though the results are accurate. Answering such queries approximately has been proposed as a technique for reducing query response times when a precise answer is not necessary or when early feedback is helpful. Time can be saved when an approximate answer can be rapidly generated so that a decision can be made based on the approximate answer whether the complete execution of a query should be completed.

An approximate answer to a query is easily conceptualized when the answer to the query is, for example, an image. Instead of returning the actual image as the answer to the query, a compressed version of the image can be returned as an approximate answer. Alternatively, a series of compressed images can be retrieved, with each successive image being compressed less (more accurate) than the previously retrieved image, and with the last image retrieved being the actual image. This particular approach is provided by many existing systems, including web browsers, such as Netscape Navigator.

There has been extensive work in connection with approximate query answering ranging from theoretical foundations, to actual systems, to using query generalization for obtaining non-empty query answers. For background regarding established theoretical foundations, see, for example, P. Buneman et al., A semantics for complex objects and approximate queries, Proc. 7th ACM SIGMOD-SIGACT Symposium on Principles of Database Systems, pp. 305–314, April 1988, which is incorporated by reference herein. For background regarding actual systems, see, for example, Ozsoyoglu et al., Processing real-time non-aggregate queries with time-constraints in CASE-DB, Proc. 8th International Conference on Data Engineering, pp. 140–147, Tempe, Ariz., February 1992; and S. Vrbsky et al., APPROXIMATE: A query processor that produces monotonically improving approximate answers, IEEE Trans. on Knowledge and Data Engineering, 5(6), December 1993, each of which is incorporated by reference herein. For background regarding query generalization for obtaining non-empty query answers, see, for example, A. Motro, Query generalization: A method for interpreting null answers, L. Kerschberg, editor, Expert Database Systems, Proceedings from the First Inter-national Workshop, Benjamin/Cummings, Inc., Menlo Park, Calif., pp. 597–616, 1986, which is incorporated by reference herein. All of this work has been based on a subset/superset definition for approximations that has been obtained mostly through a partial query process.

Online aggregation is another technique used for approximate query answering, but is applicable only for queries that return aggregates, that is, individual values, not sets. The focus of online aggregation techniques has been to efficiently compute aggregates in an online fashion using an interactive interface providing continuous feedback relating to the expected distance of the current aggregate approximation from its actual value. Online aggregation has also been based on defining approximations as subset and/or supersets of an actual answer. For background regarding aggregate queries, see, for example, J. M. Hellerstein et al., Online aggregation, Proc. ACM SIGMOD Conference on the Management of Data, pp. 171–182, Tucson, Ariz., June 1997, which is incorporated by reference herein. For background regarding approximations as subsets and/or supersets of an actual answer, see, for example, P. Buneman et al., supra.

There has also been a considerable amount of work using statistical techniques for approximating data in databases, particularly in the context of selectivity estimation in query optimizers. Three widely studied classes of statistical techniques are sampling techniques, parametric techniques (approximating the data using a mathematical distribution), and histogram (or non-parametric) techniques.

For additional background regarding sampling techniques, see, for example, P. J. Haas et al., Sampling-based estimation of the number of distinct values of an attribute, Proc. of the 21st Int. Conf on Very Large Databases, pp. 311–322, 1995; R. J. Lipton et al., Practical selectivity estimation through adaptive sampling, Proc. of ACM SIGMOD Conf., pp. 1–11, May 1990; and S. Seshadri et al., Sampling issues in parallel database systems, Extending Database Technology (EDBT), pp. 328–343, March 1992, each of which is incorporated by reference herein. For background regarding parametric techniques, see, for example, C. M. Chen et al., Adaptive selectivity estimation using query feedback, Proc. of ACM SIGMOD Conf., pp. 161–172, May 1994, which is incorporated by reference herein. For background regarding histogram techniques, see, for example, Y. Ioannidis, Universality of serial histograms, Proc. of the 9th Int. Conf on Very Large Databases, pp. 256–267, December 1993; Y. Ioannidis et al., Optimal histograms for limiting worst-case error propagation in the size of join results, ACM TODS, 1993; Y. Ioannidis et al., Balancing histogram optimality and practicality for query result size estimation, Proc. of ACM SIGMOD Conf., pp. 233–244, May 1995; RP. Kooi,. The optimization of queries in relational databases, Ph.D. thesis, Case Western Reserve University, September 1980; M. V. Mannino et al., Statistical profile estimation in database systems, ACM Computing Surveys, 20(3):192–221, Sept 1988; M. Muralikrishna et al., Equi-depth histograms for estimating selectivity factors for multi-dimensional queries, Proc. of ACM SIGMOD Conf., pp. 28–36, 1988; G. Piatetsky-Shapiro et al., Accurate estimation of the number of tuples satisfying a condition, Proc. of ACM SIGMOD Conf , pp. 256–276, 1984; and V. Poosala et al., Improved histograms for selectivity estimation of range predicates, Proc. of ACM SIGMOD Conf, pp. 294–305, June 1996, each of which is incorporated by reference herein.

Of these particular techniques, histograms are probably the most widely used statistical technique in commercial database systems. For example, histograms are used in the DBMSs of Oracle, Sybase, Microsoft and IBM, because histograms occupy small amounts of space, do not incur significant overhead at estimation time and histograms are particularly suited for accurately approximating the skewed distributions arising in real-life.

Previously, several classes of histograms for building on one or more attributes have been identified. Additionally, techniques have been proposed for incrementally maintaining many of the classes of histograms up-to-date as the database is updated. For background regarding classes of histograms, see, for example, V. Poosala et al., Improved histograms for selectivity estimation of range predicates, Proc. of ACM SIGMOD Conf., pp. 294–305, June 1996; and V. Poosala et al., Selectivity estimation without the attribute value independence assumption, Proc. of the 23rd Int. Conf on Very Large Databases, August 1997, each of which is incorporated by reference herein. For background regarding techniques for maintaining many of the novel classes of histograms incrementally, see, for example, Phillip B. Gibbons et al., Fast incremental maintenance of approximate histograrms, Proc. of the 23rd Int. Conf on Very Large Databases, August 1997, which is incorporated by reference herein. Except for sampling none of the other techniques, however, have been previously studied in the context of approximate query answering.

Nevertheless, such conventional approaches are not particularly useful for many database applications because an answer to an SQL query is a relation, i.e., a (multi)set of tuples. (The term "set", as used herein, means a multiset whenever no confusion can arise.) Improved insight into whether an accurate answer should be pursued is provided by a set having roughly the same number of tuples as the actual answer to a query and containing values that are approximations of the actual values (e.g., a numeric field having the approximate value of 10 instead of the actual value of 9). Additionally, the improved insight becomes more apparent when the query result is presented visually. In that regard, an analogy of a visually presented approximate answer can be drawn to an approximate (compressed) image because a large number of somewhat misplaced (approximate) points provide an improved approximation to an actual answer than a small number of actual points.

To illustrate this concept, consider an exemplary employee relational database EMP and a hypothetical query requesting values of the 'salary', 'age', and 'department' attributes from the EMP database. Further assume that the query result is to be visually displayed as a set of points or elements (a starfield) in the salary-age space, such that each point represents an employee having the corresponding salary and age. For this example, the shade (or color) of each respective point represents the corresponding departmental attribute of the employee represented by the point. FIG. 1 shows an exemplary starfield display representing an actual answer to the hypothetical query. The abscissa of FIG. 1 shows the attribute salary, while the ordinate shows the attribute age. The departmental attribute for each respective element is represented by a hollow or solid point.

Consider two approximations to the query answer of FIG. 1 that is shown in FIGS. 2 and 3, and which each use the same point display scheme as FIG. 1. The first approximation, shown in FIG. 2, is a small subset of the actual answer obtained by a sample-based query processing and is based on a 20% sample. The second approximation, shown in FIG. 3, is a set having elements that are close to elements of the actual answer to the query (value proximity). In most cases, the approximation represented by FIG. 3 is preferable to the approximation represented by FIG. 2 because the approximation of FIG. 3 provides improved insight for the actual answer of FIG. 1. The natural question that arises from the example of FIGS. 1–3 is how can approximate query results of the form shown in FIG. 3 be generated.

SUMMARY OF THE INVENTION

The present invention provides a technique that can be used for generating histogram-based approximate query results. The advantages of the present invention are provided by a method for generating an approximate answer in response to a query to a database in which an SQL query Q for operating on a relation R in a database is received. According to the invention, relation R has an associated histogram H that is preferably a MaxDiff histogram. The SQL query Q is translated to be a query Q' for operating on histogram H for obtaining a result histogram. The result histogram is then expanded into a relation having tuples containing approximate attribute values based on a frequency of each value. Translating the SQL query Q includes forming a relational algebra operator tree T that is equivalent to query Q. The relational algebra operator tree T includes at least one of a select operation, a project operation and a join operation. A tree T' is formed by replacing each base relation in leaves of tree T by a corresponding histogram. Another histogram is generated by translating each operator into an SQL query that takes at least one histogram as an input based on children of the operator. When the SQL query Q includes a join operation, the join operation is translated into a sequence of two queries.

BRIEF DESCRIPTION OF THE DRAWING

The present invention is illustrated by way of example and not limitation in the accompanying figures in which like reference numerals indicate similar elements and in which.

DETAILED DESCRIPTION

Figure 3:
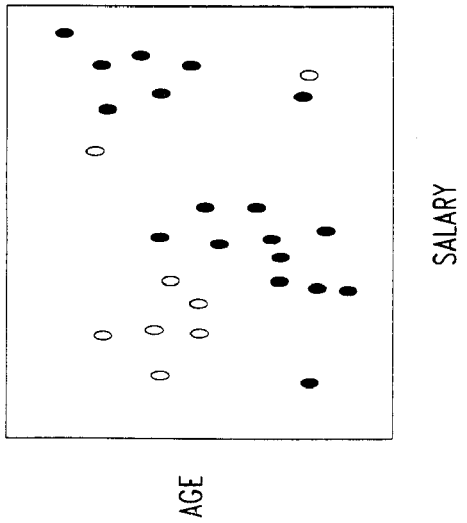
FIG. 3 is a starfield display that is a second exemplary approximation of the display of FIG. 1 that having elements that are close to elements of the actual answer to the query.
Figure 2:
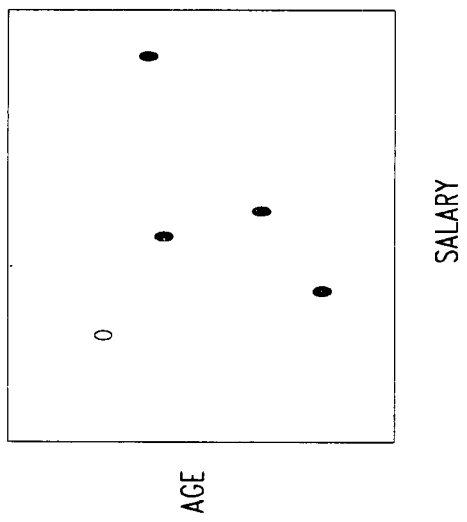
FIG. 2 is a starfield display that is a first exemplary approximation of the display of FIG. 1 that is based on a sample-based query processing.
Figure 1:
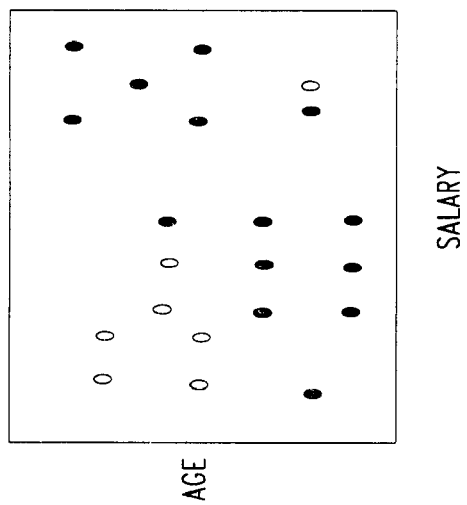
FIG. 1 is an exemplary starfield display representing an actual answer to a hypothetical query.

The present invention generates approximate responses to queries using histograms in a relational database environment. The present invention stores histograms as regular relations in a relational DBMS and translates complex SQL database queries into equivalent algebraic operations on the corresponding histograms so that approximate query answers can be obtained using the same mechanism as exact query answers. To this end, the present invention uses a histogram algebra that can be used for expressing all required queries on histograms. The present invention also provides a dissimilarity metric between relations (in general, multisets), so that errors between accurate and approximate query answers can be satisfactorily quantified.

As an illustration of the advantages of the present invention, consider the attribute 'age' in the exemplary relational database Emp described above and the following simple SQL query attempting to analyze the distribution of age values with respect to a particular threshold:

select unique age from Emp where age >40

Further assume that the 3-bucket histogram shown in Table 1 is maintained for the age attribute:

TABLE 1

| Bucket # | Value range | number of unique values | approximate frequency |
| --- | --- | --- | --- |
| 1 | 10–30 | 3 | 5 |
| 2 | 30–60 | 7 | 4 |
| 3 | 80–90 | 6 | 8 |

The 3-bucket histogram of Table 1 can be used for generating an approximate answer to the simple SQL query. The approximate answer is shown horizontally in Table 2 rather than in a traditional vertical manner.

TABLE 2

| 45 | 50 | 55 | 60 | 80 | 82 | 84 | 86 | 88 | 90 |
| --- | --- | --- | --- | --- | --- | --- | --- | --- | --- |

The approximate answer can be obtained based on the uniform spread assumption within each bucket, that is, assuming that the values that fall within the range of a bucket (the number recorded in the third column of Table 1) are positioned at equal distances from each other. For background regarding the uniform spread assumption, see, for example, V. Poosala et al., Improved histograms for selectivity estimation of range predicates, Proc. of ACM SIGMOD Conf., pp. 294–305, June 1996, which is incorporated by reference herein. The uniform spread assumption may not be as accurate because several actual relations can generate the histogram of Table 1. Consequently, the resulting set is almost never accurate. Nevertheless, the resulting set is a good approximation of the actual answer. Moreover, given the fact that histograms are stored in catalogs that typically fit in memory, obtaining such an approximation is almost instantaneous, thereby providing a valuable and quick first glance at what the nature of the actual answer.

In principle, the concepts of using histograms for obtaining approximate answers can be generalized for much more complex queries involving multiple attributes from the same relation (either through the attribute value independence assumption or by maintaining multidimensional histograms), joins, aggregates, etc. For details regarding maintenance of multidimensional histograms, see, for example, M. Muralikrishna et al., Equi-depth histograms for estimating selectivity factors for multi-dimensional queries, Proc. of ACM SIGMOD Conf., pp. 28–36, 1988, which is incorporated by reference herein. After all, the histograms maintained within a database are an approximation of the database, so executing a query on the histograms provides an approximation of the actual answer. Moreover, the great advantage of taking the histogram approach of the present invention for approximate queries is that almost all conventional database systems already maintain histograms, so obtaining an approximate answer based on histograms does not require any fundamental changes to conventional database systems.

Approximation, according to the present invention, is based on accepting any arbitrary set as an approximate answer and determining a distance from the actual answer based on a dissimilarity metric. In the following description, a relational model is used as the underlying environment for the present invention, it should be understood that the methodology used by the present invention can be applied in more general settings.

Identifying an appropriate metric for measuring the distance between two multisets is essential for any systematic study of approximation of set-valued query answers. In the case of the present invention, the distance that is to be measured is between the multiset representing the actual answer and the multiset representing an approximate answer Unfortunately, sets (let alone multisets) are not typically embedded in metric spaces, so there is no metric for measuring the distance between two multisets, except for the Hausdorff distance, which is used in connection with data clustering. The Hausdorff distance addresses aspects of set differences that are different from approximate query answering. For background relating to the Hausdorff distance, see, for example, Huttenlocher, Comparing images using the Hausdorff distance, IEEE Transactions on pattern analysis and machine intelligence, 15(9), September 1993, which is incorporated by reference herein.

Two well-known approaches for comparing sets are based on general sets and data distributions. For general sets, a comparison of sets is based on the lattice of subsets generated by a universe of set elements. A typical distance that can be defined is based on the cardinality of the symmetric difference between the two sets $S_1$ and S2, i.e., $$\mathrm{dist}_{\{\ \}}(S_1, S_2) = |(S_1 - S_2) \cup (S_2 - S_1)|.$$

This particular distance can be generalized for multisets by making each copy count in the multiset difference.

For data distributions, a distance measurement is based on various distribution moments. Specifically, if $F_1 = \{f_{11}, \ldots, f_{1n}\}$ and $F_2 = \{f_{21}, \ldots, f_{2n}\}$ represent the frequency sets of two data distributions on a universe of n elements, then the family (for $i \geq 1$) of moment-related distances is:

$$dist_{dd}^{(m)}(F_1, F_2) = \frac{1}{n} \left( \sum_{k=1}^{n} |f_{1k} - f_{2k}|^m \right)^{1/m}.$$

Note that dist coincides with $dist_{dd}^{(1)}$ for multisets. Clearly, both of these approaches are only applicable for special cases and do not capture proximity the way that is required for approximate query answering. A key limitation is that neither approach takes into account the actual values of the set elements or the data distribution. Instead, the focus is on the presence or absence of the elements and their corresponding frequencies.

According to the present invention, there is a straightforward total order that can be defined on elements of the data for most common data types (i.e., integers, reals, and even strings) that can be used as a basis for a definition of a distance between two elements. For numeric data types (both integer and real numbers), there is essentially one logical distance metric, that is, the distance $dist_{num}$ between two numbers $b_1$ and $b_2$ is $$dist_{dd}^{(m)}(b_1, b_2) = |b_1 - b_2|$$

Most data models are defined by recursive applications of two major constructors on the basic data types, i.e., a tuple constructor and a set constructor. For tuple objects, several distance metrics have been defined based on the needs of different applications. Among the distance measures for objects, the most common distance measure is a family of distances expressed as power-sums of the individual distances of the tuple elements. In particular, consider two tuples $t_1 = <(b_{11}, \ldots, b_{1n})$ and $t_2 = \{b_{21}, \ldots, b_{2n}\}$. Consider a generic distance metric $dist_{basic}$ for the object types of the individual elements of the tuples. The $distance_{tup}^{(m)}$ for any $m \geq 1$ between $t_1$ and $t_2$ is $$dist_{tup}^{(m)}(t_1, t_2) = \frac{1}{n} \left( \sum_{k=1}^{n} dist_{basic}(b_{1k} - b_{2k})^m \right)^{1/m}.$$

The so-called Manhattan distance is obtained when m=1. When m=2, the Euclidean distance is obtained, and so on. Assuming that $dist_{basic}$ behaves in the same manner (as is typically the case), the actual values of the tuple elements play an important role in computing the tuple distance.

Contrary to tuple objects, there are no distance metrics for set or multiset objects that are in common use. Conventional distance metrics are for special cases only and do not incorporate the actual values of the set elements. A key criterion for the distance metric between multisets is to capture as much of the nature of approximation as possible implied in approximate query answering in which both the actual values in an answer and their frequencies are significant.

Consider two multisets $S_1 = \{u_1, \ldots, u_n\}$ and $S_2 = \{v_1, \ldots, v_m\}$, and a distance metric dist for the object type of the multiset elements. Also consider a complete bipartite graph $G_{S_1, S_2}$ where the two classes of nodes correspond to the elements of the two multisets. Each element is represented by as many nodes as there are copies of the element in the multiset. Each edge $(u_i, v_j)$ is associated with a cost equal to $dist(u_i, v_j)$. The distance $DIST^{(l,m)}$ (for any power $1 \geq 0 m \geq 0$) between $S_1$ and $S_2$ is $$DIST^{(l,m)}(S_1, S_2) = \sum_{(ui, vj) \in C} mult^l(u_i, v_j) \times dist[q]^m(u_i, v_j), \quad (1)$$

where C is a minimum edge-cost node cover of $G_{S_1, S_2}$, i.e., a subset of the edges of $G_{S_1, S_2}$ such that (a) for each node, there is at least one edge in C adjacent to the node, and (b) the following expression is minimized:

$$MINCOVER(S_1, S_2) = \sum_{(ui, vj) \in C} dist(u_i, v_j). \quad (2)$$

Essentially, minimum edge-cost node cover C indicates which element of one multiset approximates which element of the other multiset. Distance DIST then determines the distance that the overall approximation implies. For each edge $(u_i, v_j)$ in C such that $d_1$, edges are incident to $u_i$ and $d_2$ edges are incident to $v_j$ in Eq. (1), the following hold:

$$mult(u_i, v_j) = \begin{cases} 1 & \text{if } \max(d_1, d_2) = 1 \\ \max(d_1, d_2) = 1 & \text{otherwise} \end{cases}$$

$$dist[q](u_i, v_j) = \begin{cases} dist(u_i, v_j) & \text{if } \max(d_1, d_2) = 1 \\ dist(u_i, v_j) + q & \text{otherwise} \end{cases}$$

It can be easily shown that $\min(d_1, d_2)$ always equals 1. Essentially, $mult(u_i, v_j)$ captures the extent to which one of $u_i$ or $v_j$ is paired with multiple elements of the other multiset. The multiplication by $mult(u_i, v_j)$ in Eq. (1) penalizes that case accordingly. Likewise, q (for quantum, any small integer, typically 1) increases the distance between paired elements whenever the pairing is not exclusive on both sides.

Figure 4:
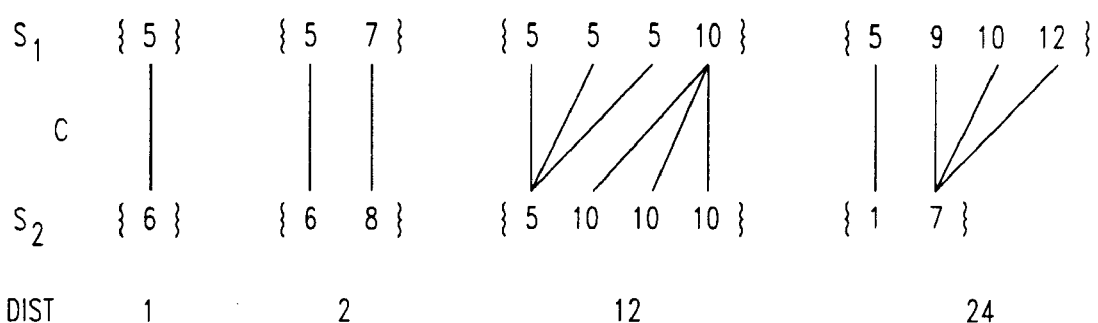
FIG. 4 shows a set of exemplary multisets illustrating the distance metric of the present invention.

FIG. 4 shows a set of exemplary multisets illustrating the distance metric of the present invention. The top and third rows of FIG. 4 respectively show different exemplary multisets for multisets $S_1$ and $S_2$. The second row of FIG. 4 shows different minimum edge-cost node covers C for the different exemplary multisets $S_1$ and $S_2$. The fourth row of FIG. 4 shows the DIST metric for the corresponding multisets $S_1$ and $S_2$. Many well-known metrics fail in correctly computing the distance between multisets, whereas DIST works quite satisfactorily. The specific form of Eq. (1) combines the differences between two multisets on both the actual value level and their frequency of occurrence.

Some indication of the appropriateness of Eq. (1) as a distance measure between multisets is that the formula is symmetric, i.e., $DIST(S_1, S_2) = DIST(S_2, S_1)$. For certain special cases, Eq. (1) reduces to well-accepted specialized distances. For example, DIST for singleton sets is equal to the distance of their elements. For frequency distributions having the same set of elements appearing in sets and for q=1, DIST is equal to the corresponding moment-related distance raised to the lth power. For identical multisets, DIST is always equal to 0. Additionally, as more space is allocated to various approximation techniques, the DIST value for the actual and approximate results becomes smaller, as should happen. Efficient algorithms are available for computing Eq. (1)

Before describing additional details of the present invention, the following definitions are presented, which are useful for understanding the histogram-based approximate query answering technique of the present invention. The "value set $V_i$" of attribute $X_i$ is defined to be the set of values of $X_i$ that are present in R. Let $V_i = \{v_i(k): 1 \leq k \leq D_i\}$, where $v_i(k) < v_i(j)$ when $k < j$. The "spread $s_i(k)$" of $v_i(k)$ is defined to be $s_i(k) = v_i(k+1) - v_i(k)$, for $1 \leq i \leq D_i$. (We see $s_i(D_i) = 1$.) The "frequency $f_i(k)$" of $v_i(k)$ is defined to be the number of tuples in R with $X_i = v_i(k)$. The "area $a_i(k)$" of $v_i(k)$ is defined to be $a_i(k) = f_i(k) \times s_i(k)$. The "data distribution" of $X_i$ is defined to be the set of pairs $T_i = \{(v_i(1), f_i(1)), (v_i(2), f_i(2)), \ldots, (v_i(D_i), D_i))\}$. Typically, several real-life attributes tend to have "skewed" or highly non-uniform data distributions. The main characteristics of such distributions are unequal frequencies and unequal spreads.

A "histogram" on an attribute X is constructed using a "partitioning rule" for partitioning the data distribution of attribute X into $\beta$ ($\geq 1$) mutually disjoint subsets called buckets and approximating the frequencies and values in each bucket in some well-known manner. In particular, the most effective approach for values is the uniform spread assumption, such as disclosed by V. Poosala et al., Improved histograms for selectivity estimation of range predicates, Proc. of ACM SIGMOD Conf., pp. 294–305, June 1996, which is incorporated by reference herein. Under the uniform spread assumption, u attribute values are assumed to be placed at equal intervals between the lowest and highest values in a bucket, where u is the actual number of distinct values grouped into the bucket. The most effective approach for frequencies is the uniform frequency assumption, under which the frequencies in a bucket are approximated by their average. The following example, shown in Table 3, illustrates these concepts for a hypothetical attribute X.

TABLE 3

| Quantity | Data Distribution Element | | | | | | |
|---|---|---|---|---|---|---|---|
| Attribute Value | 10 | 50 | 60 | 70 | 80 | 85 | 100 |
| Frequency | 100 | 130 | 120 | 600 | 200 | 80 | 200 |
| Spread | 40 | 10 | 10 | 10 | 5 | 15 | 1 |
| Area | 4000 | 1300 | 1200 | 6000 | 1000 | 1200 | 200 |

Consider a 4-bucket histogram for hypothetical attribute X with the following bucketization of attribute values: $\{10\}$ $\{50, 60\}$, $\{70\}$, $\{80, 85, 100\}$. The approximate distribution captured by the 4-bucket histogram is shown in Table 4.

TABLE 4

| Quantity | Data Distribution Element | | | | | | |
|---|---|---|---|---|---|---|---|
| Approx. Attribute Value | 10 | 50 | 60 | 70 | 80 | 90 | 100 |
| Approx. Frequency | 100 | 125 | 125 | 600 | 160 | 160 | 160 |

It is often useful to "expand" a histogram into a relation having tuples containing the approximate attribute values, with each tuple appearing as many times as the approximate frequency of the value. An expanded relation is referred to as the approximate relation (ApproxRel) of the histogram.

A histogram can also be built on multiple attributes together by partitioning the value combinations of the joint distribution of the attributes into multi-dimensional buckets. The value domain is approximated by an extension of the uniform spread assumption. Details are omitted here, but suffice it to say that the values are spaced at discrete and equal intervals throughout the multi-dimensional region occupied by the bucket. The frequencies are once again approximated by a single average value. It is also possible to combine two histograms on different sets of attributes to obtain a single histogram on the union of the two different sets by making the attribute value independence assumption.

Given the mechanisms of approximation within a histogram, the accuracy of the approximation is determined by which attribute values are grouped together into each bucket. Several partitioning rules can be used for this purpose. For example, consider the well-known Equi-Width and Equi-Depth histograms, which group contiguous ranges of attribute values into buckets, but differ in the partitioning rule that is used for grouping. In an Equi-Width histogram, all buckets are assigned value ranges of equal length. In an Equi-Depth histogram, all buckets are assigned the same total number of tuples.

A particular class of histograms called MaxDiff(V,A) performs the best for estimating the selectives of most kinds of queries. In a MaxDiff(V,A) histogram, there is a bucket boundary between two successive attribute values if the difference between the areas of these values is one of the $\beta+1$ largest such differences. The area captures both the frequency and value domains. By avoiding grouping dissimilar frequencies or spreads, a MaxDiff(V,A) histogram ensures that the uniform frequency and spread assumptions do not cause many errors in the approximation. As an illustration, consider the exemplary histogram shown in Table 3, which is a MaxDiff(V,A) histogram. Note that the two skewed values 10 and 70 are separated from other values.

Each bucket in a histogram contains information relating to the total number of tuples that fall in the bucket (tot), and for each dimension, the low and high values (lo, hi) and the number of distinct values (count) in that dimension. Preferably, histograms are stored as regular relations in a database with each bucket forming a tuple. The attributes in a d-dimensional histogram are named as follows: $lo_1, \ldots, lo_d, hi_1, \ldots, hi_d, u_1, \ldots, u_d$, and tot. The subscripts are dropped for a one-dimensional histogram. For ease of explanation, an additional set of columns $sp_1 \ldots sp_d$ that contain the average spreads along each dimension are stored in the histogram, as well as the average frequency of each unique value combination in the bucket (avg). Of course, the average spreads and frequencies can be computed from other columns $$\left(sp_i = \frac{hi_1 - lo_1}{u_i - 1} \text{ and } avg = \frac{tot}{u_1 u_2 \ldots u_d}\right)$$

and do not need to be stored. In the following description, the term "histogram" refers to a histogram relation, as described herein. For illustration, the histogram relation for the exemplary histogram of Table 3 is shown in Table 5.

TABLE 5

| lo | hi | Count | Tot | sp | avg |
|---|---|---|---|---|---|
| 10 | 10 | 1 | 100 | 0 | 100 |
| 50 | 60 | 2 | 250 | 10 | 125 |
| 70 | 70 | 1 | 600 | 0 | 600 |
| 80 | 100 | 3 | 480 | 10 | 160 |

The present invention provides techniques for automatically translating arbitrary SQL queries into SQL queries on histograms (stored as relations), which can be executed efficiently, for providing approximate answers as if the original SQL queries were executed on the approximate relations represented by the histograms. A main benefit of this approach is that a regular SQL-compliant query processor can be used to provide approximate answers with no modification. An alternative is to implement special-purpose query processing techniques on histograms outside of any standard relational DBMS. Both schemes have been implemented, but only the approach involving query translation is described herein.

For a histogram H built on a set of attributes S, there is an equivalent approximate relation having the same attributes as in S. Such a relation is denoted as ApproxRel(H). For H, a 1-dimensional histogram can be computed using an exemplary SQL query, set forth below, called Expand.sql. It is straightforward to generalize Expand.sql for a multi-dimensional histogram, but a generalized Expand.sql becomes complex without offering any additional insight, so such a generalization will not be presented.

SELECT (H.lo+$I_c$.idx* H .sp)
FROM H, $I_c$, $I_a$
WHERE $I_c$.idx≦H .ct & $I_a$.idx≦H .avg;

In the exemplary Expand.sql query, H is the histogram stored as a relation, and $I_A$ and $I_C$ are auxiliary relations, each having a single attribute idx. Relation $I_A$ ($I_C$) contains the integers 1, 2, . . . , A (1, 2, . . . , C), where A (C) is the largest count (average frequency) in the buckets of H. Essentially, query Expand.sql uses $I_C$ for generating the positions of values within each bucket and then uses the low and spread values of the bucket for computing each of the approximate values, under the uniform spread assumption. Likewise, Expand.sql uses $I_A$ to replicate each value based on its respective frequency. For example, for the histogram of Table 3, A and C are 600 and 3, respectively. Performing Expand.sql on the relation yields a relation having a single attribute containing 100 10's, 125 50's, 125 70's, 600 70's, and 160 tuples each of 80, 90, 100.

In general, there may be several one- and/or multi-dimensional histograms involving attributes of a given relation R, a combination of which provides an approximation for the entire relation R (e.g., through the attribute value independence assumption). For simplicity of presentation in Definition I below, it is assumed that there is a single multi-dimensional histogram on R.

Definition 1: Consider a query Q operating on relations $R_1$ . . . $R_n$, and let $H_1$, . . . $H_n$ be the histograms on relations $R_1$ . . . $R_n$. The correct approximate answer for Q and $\{H_i\}$ is the result of the following two-step process:
 1. Compute ApproxRel($H_i$) using Expand.sql; and
 2. Execute a version of Q where, $R_i$ has been replaced by ApproxRel($H_i$) for $1 \leq i \leq n$.

Using Definition 1 to obtain approximate answers, as is, however, is impractical because ApproxRel($H_i$) may have as many tuples as $R_i$, thereby defeating the whole purpose of providing an approximate answer to a query. A different, but equivalent approach to approximate query processing that postpones the application of query Expand.sql to the end is given by Definition 2.

Definition 2: Consider a query Q operating on relations $R_1$ . . . $R_n$, and let $H_1$ . . . $H_n$ be the histograms on relations $R_1$ . . . R $_n$. A query Q' on histograms $H_1$ . . . $H_n$ is a valid translation of Q if the result of Q' is a histogram whose corresponding approximate relation is identical to the correct approximate answer for query Q and $\{H_i\}$.

Figure 5:
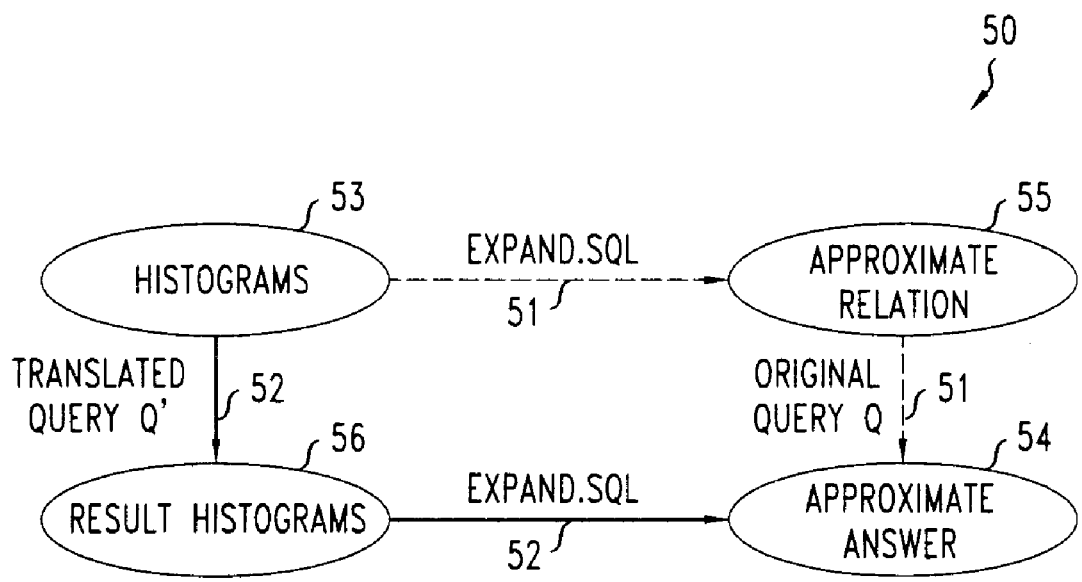
FIG. 5 shows a flow diagram of a valid query translation according to the present invention.

Definition 2 is illustrated in the transition diagram 50 of FIG. 5. Essentially, Q' is a valid translation of Q when the diagram commutes. That is, both paths 51 and 52 from the histogram node 53 to the approximate answer node 54 generate the same answer.

The dashed path 51 in FIG. 5 through approximate relation node 55 corresponds to a naive application (Definition 1) to obtain a correct query answer. The solid path 52 in FIG. 5 through result histogram node 56, however, is the following, much more efficient approach for obtaining the same result:

1. obtain a valid translation Q' of Q.
 2. execute Q' on $\{H_i\}$ to obtain a result histogram H.
 3. compute ApproxRel(H) using Expand.sql.

Because most of the query processing takes place on small histogram relations, the approach of path 52, that is, the approach of the present invention, is extremely efficient.

Aggregate and non-aggregate SQL queries containing Select, From and Where clauses are described below, but nesting, Group-by or Having clauses are not described herein for simplicity and because such features can be added in a straightforward manner. According to the present invention, non-aggregate queries are equivalent to relational algebra expressions involving only selection, projection, and join operations. A query Q in this category of queries is translated as follows:

1. Construct a relational algebra operator tree T of select, project, and join operations that is equivalent to Q.
 2. Replace all the base relations in the leaves of T by their corresponding histograms to obtain another tree T'.
 3. Starting from the bottom of T', translate each operator into an SQL query that takes one or two histograms as an input based on the children of the operator and generates another histogram as an output.

In general, there are many algebraic expressions that may be chosen in step 1 of the non-aggregate query translation process that each provide a different valid translation. Although each respective algebraic expression may differ in cost, the cost is so low that there is no real need for optimization among the different algebraic expressions.

A key aspect of the non-aggregate query translation process is step 3 because it involves translations of individual operators, which, although not particularly complex, are not completely straightforward either. Consequently, they are described below. For simplicity, only one-dimensional histograms are dealt with. Multi-dimensional histograms are similar, but more cumbersome.

An equality selection ($\sigma_{A=c}$) is translated into the following query Q=:

SELECT c, c, 1, ave
FROM H
WHERE (c≧1) & (c≦h) & (mod(c−lo.sp)+0);

A Range selection ($\sigma_{A \leq c}$) query is translated into the following query $Q_o$:

$SELECT^*$     $SELECT\ lo,\ lo+sp^*\left\lceil\frac{c-lo}{sp}\right\rceil^*ct,\ \left\lceil\frac{c-lo}{sp}\right\rceil^* ct,\ avg$

FROM H     ∪   FROM H

WHERE $h_i \leq c$;     WHERE $(lo \leq c)$ &$(hi > c)$;

Other range predicates can also be written in a similar manner, with suitable modifications.

Assuming duplicate elimination, a projection ($\pi_A$) is translated into the following query $Q_x$:

SELECT lo, hi, count,1
FROM H;

Assuming no duplicate elimination, projection is merely the identity query for one-dimensional histograms, i.e., selecting all tuples from the histogram. relation with no changes.

For an Equi-Join($R_1 \bowtie_{R_1.A=R_2.B} R_2$), let $H_i$ be the histogram on the joining attribut of $R_i$, and $N_i$ be the largest count in the buckets of $H_i$. A join is translated into a sequence of two queries Q1⋈ and Q2⋈. According to the present invention, an equi-join is more efficient by initially running another simple query for identifying overlapping buckets in the histograms and then executing Q1⋈, and Q2⋈, for each pair of overlapping buckets. For simplicity, this step is omitted. The first query Q1⋈ computes the frequency distribution of the approximate join result by joining the approximate frequency distributions of $H_1$ and $H_2$. The existence of two auxiliary relations of integers $I_{N_1}$ and $I_{N_2}$ that are defined in the same fashion as $I_A$ and $I_C$, described above, are assumed.

SELECT $(H_1.lo+I_{N_1}.idx * H_1.sp)$ as v, $H_1.lo$ as $lo_1$, S.so as $lo_2$, $H_1.avg * H_2.avg$

FROM $H_1$, $H_2$, $I_{N_1}$, $I_{N_2}$

WHERE $(H_1.lo+I_{N_1}.idx * H_1.sp=H_2.lo+I_{N_2}.idx * H_2.sp)$ & $(I_{N_1}.idx \leq H_1.count)$ & $(I_{N_2}.idx \leq H_2.count)$;

The second query Q2⋈. converts the result Q1R of query Q (a frequency distribution) into a histogram by appropriate grouping.

SELECT min(v), max(v), count(*), avg

FROM Q1R

Group By $lo_1$, $lo_2$, avg;

The overall concept of a translation of a non-aggregate query is illustrated in the following example. Consider the following SQL query:

SELECT R2B

FROM R1, $R_2$

Figure 6A:
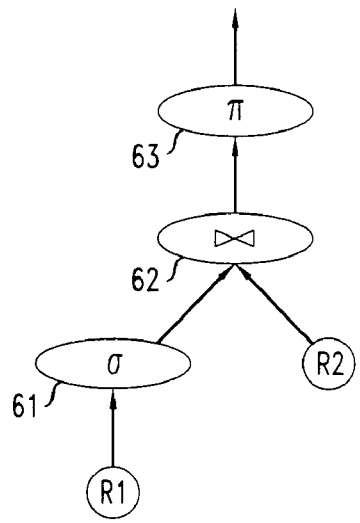
FIGS. 6a and 6b respectively show an equivalent operator tree and the corresponding translation result according to the present invention.
Figure 6B:
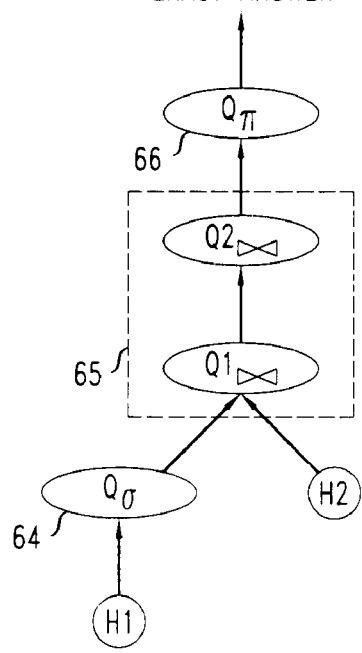

WHERE R1.A≦10 & R1.B=R2.B;

An equivalent operator tree and the corresponding translation result (a histogram query sequence depicted as nodes in a tree) are shown in FIGS. 6a and 6b, respectively. In FIG. 6a, an equality selection σ query is made of a relation R1 at 61. An equi-join query is then performed at 62 using the equality selection of R1 and a relation R2. A projection query is performed at 63. In FIG. 6b, a translation of the equality selection query (61) is formed at 64 and then the query is performed on a histogram H1 that is associated with relation R1. A translation of the equi-join query (62) is formed and the translated query is performed on H1 at 65. Similarly, a translation of equi-join query (62) is formed and the translated query if performed on a histogram H2 that is associated with relation R2. The first query computes the frequency distribution of the approximate join result by joining the approximate frequency distributions of $H_1$ and $H_2$. A translation of the projection query (63) is formed and executed at 66.

In general, an aggregate query $Q_{agg}$ can be viewed as computing an aggregate over selected attributes in the result of a non-aggregate query Q. Hence, a valid translation for $Q_{agg}$ consists of a valid translation for Q producing a histogram H followed by an aggregate-specific SQL query on H computing a 1-element, 1-bucket histogram containing the aggregate value. Aggregate-specific queries for computing aggregate histograms are given in Table 6, for the most common aggregate operators. In Table 6, bsum is equal to $$\left(avg * count * \left(lo + \frac{sp * (count - 1)}{2}\right)\right).$$

TABLE 6

| | | MAX | | |
|---|---|---|---|---|
| Distinct COUNT | SUM | AVG | MAX | MIN |
| SELECT SUM(count) FROM H: | SELECT SUM(bsum) FROM H: | SELECT SUM(bsum)/SUM(count) FROM H: | SELECT MAX(hi) FROM H: | SELECT MIN(lo) FROM H: |

It can be easily seen that the computational complexity for translated queries for selections and projections access only β tuples, where β is the number of buckets in the histogram. This number of buckets in the histograms is usually insignificant compared to the number of tuples in the relations. For joins, the translated queries access $u_1+u_2+\beta_1+\beta_2$ tuples, where $u_i$ is the number of distinct attribute values in $H_i$ and $\beta_i$ is the number of buckets in $H_i$. The total number of operations is also proportional to $u_1+u_2+\beta_1+\beta_2$ because a translated join query can be best run using SortMerge joins by always storing the histograms and the auxiliary relations in sorted order. Nevertheless, the complexity of joins is still significantly less than the cost of running the original query because the number of distinct attribute values in $H_i$ is $u_i$, which is typically much less than the number of tuples in the relations.

Figure 7:
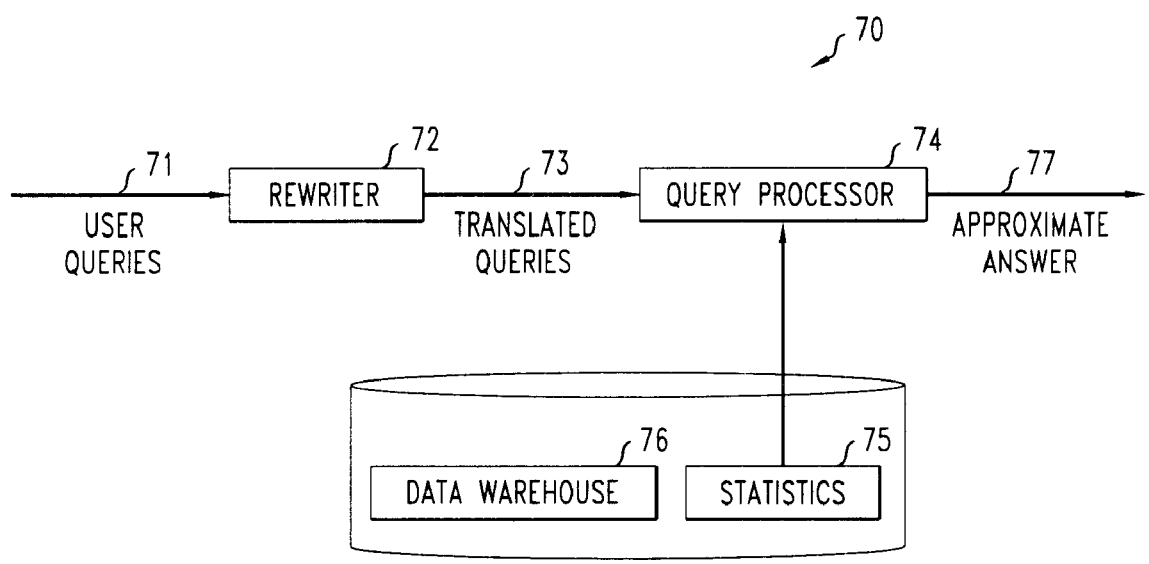
FIG. 7 shows the architecture for the AQUA system that can be used with the present invention.

Query rewriting according to the present invention has been incorporated into a general-purpose query processor called AQUA (Approximate QUery Answering System). The architecture 70 of the AQUA system is shown in FIG. 7. User queries 71 are received by a query rewriter 72. Query rewriter 72 generates translated queries 73 that are input to a query processor 74. Query processor 74 accesses a statistics portion 75 of a data warehouse 76, and outputs approximate answers 77 based on histograms. Query processor 74 is also capable of providing accurate answers. The translated queries are rewritten in terms of histogram relations so that query processor 74 can approximately answer most SQL queries. Architecture 70 of the AQUA system also provides incremental maintenance of histograms and sophisticated sampling techniques.

An extensive set of test runs using the AQUA system were conducted using synthetic and real-life data (TPC-D) for analyzing the effectiveness of various statistical techniques for providing approximate query answers. The test runs involved different data sets and queries having set-valued as well as aggregate results. The results showed an overall superiority of generating approximate answers based on histograms, often producing excellent approximations using the distance metric of the present invention. Furthermore, the same histograms that are optimal for selectivity estimation are optimal for approximate answers based on histograms as well.

MaxDiff(V,A), Equi-Width, Equi-Depth classes of histograms were used for approximating the data. The corresponding approximate answering techniques are referred to herein as MaxDiff, Equi-Width, and Equi-Depth, respectively. Only MaxDiff captured skews in both value and frequency domains of the data by way of the area parameter because MaxDiff has been shown to be one of the most accurate and efficient histograms for selectivity estimation.

The traditional uniformity assumption over the entire data was also studied, which is equivalent to a histogram having a single bucket. This technique is referred to herein as Trivial. The final technique, which is referred to herein as Sampling, uses sampling for providing approximate answers. For Sampling, a set of samples was collected on each relation in the database and the submitted query was executed on the sample relations, with appropriate scaling of the final result.

To ensure a fair comparison among the different techniques, the same amount of space was allocated to each technique. The number of buckets of sample items corresponding to a space of s bytes were computed as follows. Consider a relation with d integer attributes. Because each bucket in a d-dimensional histogram stores (3*d+1) numbers, the number of buckets is $$\frac{s}{12*d+4}$$

(assuming 4 bytes per number). Similarly, because each sampled tuple contains d numbers, the corresponding sample set contains $$\frac{s}{4*d}$$

tuples. In other words, for a histogram and a sample using the same amount of space, the sample contained 3 to 4 times the number of tuples as the number of buckets in the histogram.

The test runs used an extensive synthetic database consisting of relations having 50K to 500K tuples. Parameter values of the synthetic database are shown in Table 7. Test runs were also performed on the TPC-D benchmark database, (Transaction processing performance council (TPC). TPC-D Benchmark Manual, 1996, incorporated by reference herein) generated at scale factor of 0.6, which occupied nearly 0.6 GB. The synthetic data offers more insights into the performance of various techniques and is focussed on herein rather than the TPC-D data, which has mostly uniform and independent attributes.

TABLE 7

| Parameter | Values |
| --- | --- |
| Value Skew for Cusp-Max ($z_v$) | 0.2 ! 3 |
| Frequency Skew ($z_f$) | 0 ! 3 |
| Number of Attribute Combinations (U) | 500 ! 50 K |
| Number of Distinct Values per Dimension (u) | 10 ! 10 K |
| Number of Tuples in the Relation (T) | 50 K ! 500 K |

Figure 8:
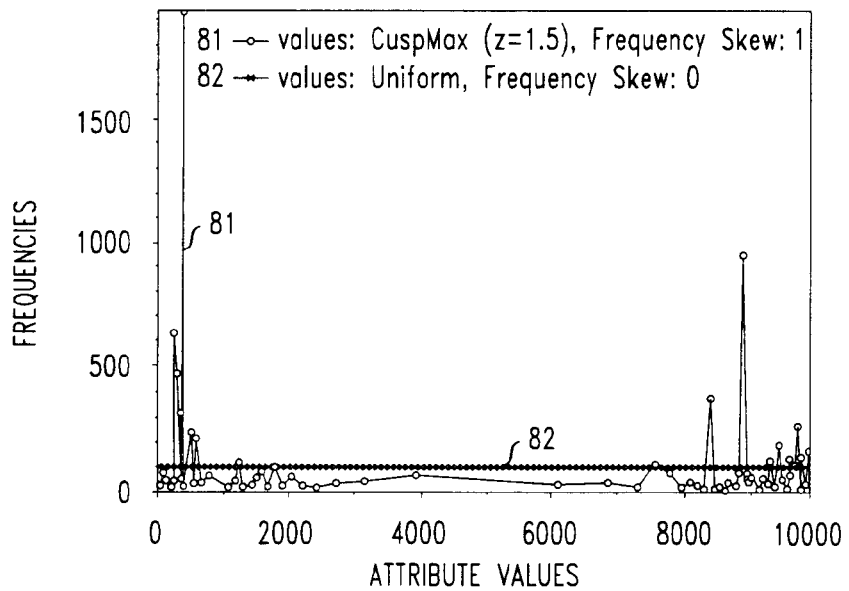
FIG. 8 shows the results of frequencies as a function of attribute values for the Cusp-Max distribution and the Uniform distribution for various techniques considered for providing approximate answers.

FIG. 8 shows the frequencies as a function of attribute values for the Cusp-Max distribution and the Uniform distribution. Frequency values for the Cusp-Max distribution are shown at 81, while frequency values for the Uniform distribution are shown at 82. The set of possible values of various data set parameters are given in Table 7.

The attribute values for the test runs were generated from a combination of Zipf distributions. For additional information regarding Zipf distributions, see, for example, G. K. Zipf, Humatt behaviour and the principle of least effort, Addison-Wesley, Reading, Mass., 1949, which is incorporated by reference herein. The details of all such combinations are given by V. Poosala et al., Improved histograms for selectivity estimation of range predicates. Proc. of ACM SIGMOD Conf, pages 294–305, June 1996. The Cusp-Max distribution consisted of increasing spreads (distances between successive values) followed by decreasing spreads, with the spreads taken from a Zipf distribution. The skew in the spreads is controlled via the z parameter (higher z implies higher skew). The Uniform distribution consisted of equally spaced values.

The frequencies of the different attribute value combinations were also generated based on Zipf distributions with different levels of skew. Because of non-uniform frequencies, a few combinations of the attributes occurred more frequently together than others, thus modeling limited forms of dependencies between the attributes.

Non-aggregate and aggregate classes of queries were used for the test runs. Non-aggregate classes included range queries, projections (with duplicate elimination), equi-joins, and select-join (SJ) queries. Range queries had selection predicates of the form (($X_i \leq a$) and ($X_i \geq a$), where $X_i$ was an attribute in one of the relations. Two-dimensional range queries, i.e., predicates of the form $X_i \leq a$ & $X_j \leq b$, were also studied. In each test run, 100 queries each were randomly generated for the "$\leq$" and "$\geq$" conditions. Select-join queries contained both join and selection operations. The canonical form of the select-join queries was as follows:

SELECT $R_1.A$
FROM $R_1, R_2$
WHERE ($R_1.A=R_2.A$) & ($R1.B \leq c$);

Projection and equi-join queries are self-explanatory.

Three classes of queries, 2-dimensional range predicates, SJ queries (which include 1-dimensional range predicates and joins), and projections, that capture all levels of complexity were focussed on.

In addition to the set-valued results of the above non-aggregate queries, the following aggregate values were also computed on the results: average, variance, sum, and count. The reasons for this are twofold. Aggregate operations are common in decision support systems, and by including count, the effectiveness of various techniques in providing selectivity estimates were studies. In all test runs, the error patterns of any given technique in estimating average and variance were extremely similar. On the other hand, the patterns for sum and count were also similar to each other, but often different from average and variance. The results for two of the aggregate operators are presented, namely, average and count.

For queries returning sets of tuples as answers, the set dissimilarity metric of the present invention (Eq. (1)) was used as an error metric. For aggregate queries, the percentage relative error $$\left(i.e., \frac{actual - estimate}{actual} * 100\right)$$

was used as an error metric.

The results indicate that the MaxDiff(V,A) histograms provide quality approximations for both set-valued and aggregate queries, outperforming sampling, which is competitive only for aggregate queries having no join operators.

For each class of queries, the effects of the following parameters as the approximation error were studied: space available to store the statistics (800–80000 bytes), frequency skew ($z_f$_0–3), and value domain skew (Uniform and Cusp-Max distribution with $z_v$=0;2–3). In addition to the error metrics, the times taken by various techniques in answering the SJ queries were also measured.

Figure 9:
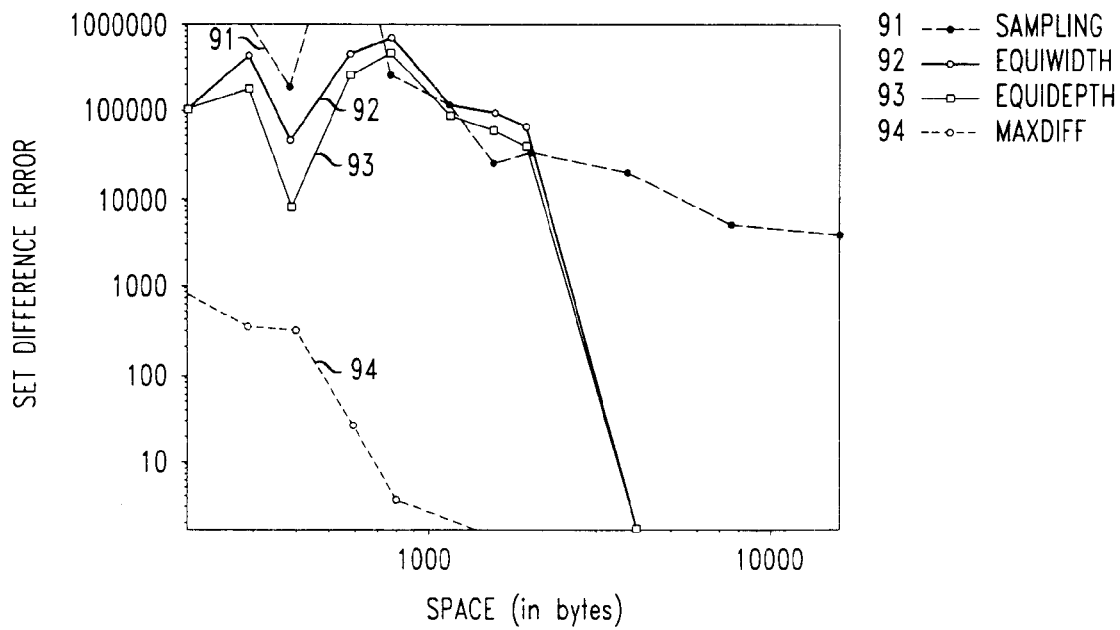
FIG. 9 shows set difference errors due as a function of space for range queries for range queries.

FIG. 9 shows errors for the various techniques (in log scale) as a function of space (in log scale). The set difference errors for Sampling, Equi-Width, Equi-Depth and MaxDiff are shown at 91–94, respectively. The frequency skew was fixed at $z_f=0.86$, which roughly corresponds to the "80–20" rule, and the value domain was Uniform. The number of tuples was 200,000. The error for Trivial is not shown in FIG. 9 because it was extremely high (above $4\times10^6$) and is out of the range depicted. As expected, the performance of the remaining techniques improved with increasing space. Among these techniques, MaxDiff performed the best and Sampling was noticeably the poorest. The reason for the superior performance of MaxDiff (and other histograms) can be traced back directly to a fundamental property of histograms, that is, they approximate the entire data distribution and capture the more skewed attribute values with high accuracy using a constant amount of space (at most 1 bucket per such value). Hence, histograms are able to perform well on selection queries on random parts of the data.

Among the histograms, MaxDiff performed best because it captured the skew in the data more accurately than other histograms. In contrast, Sampling captured a fraction of the given set precisely and missed the remaining parts completely. Furthermore, Sampling allocated disproportionate amounts of space to the high frequency values. Because the queries covered the entire value domain uniformly, many of the queries contained the low-skewed regions that may not be captured (or even approximated) at all by Sampling, resulting in a high set difference error.

Figure 10:
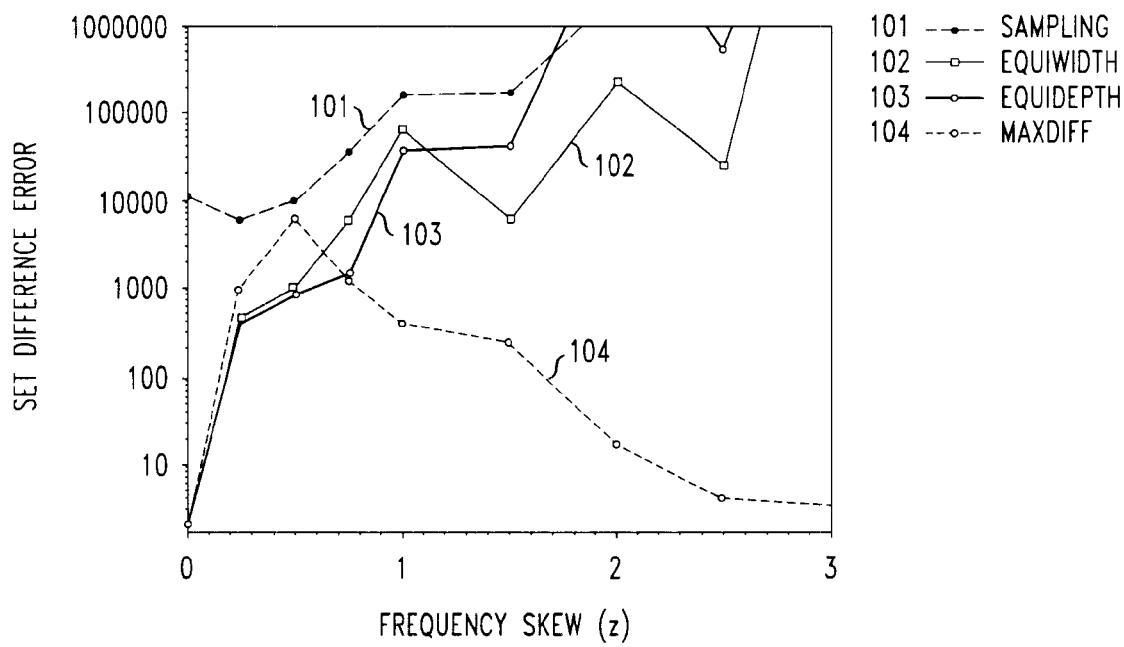
FIG. 10 shows the set different error (in log scale) as a function of frequency skew (z value) for range queries.

For analyzing the effect of frequency skew, the space was fixed at 400 bytes. FIG. 10 shows set different errors (in log scale) as a function of frequency skew (z value) for the various techniques for range queries. In FIG. 10, set difference errors for Sampling, Equi-Width, Equi-Depth and MaxDiff are shown at 101–104, respectively. MaxDiff performed excellently for all levels of skew, whereas the other histograms and Sampling suffered with increasing skew. For Sampling, errors increased with increasing frequency skew because Sampling allocated more samples for the high frequency values, degrading performance for queries on the remaining regions. On the other hand, Equi-Width and Equi-Depth performed poorly because frequency skews are not significantly considered when buckets are formed, unlike MaxDiff.

Interestingly, MaxDiff performed best for extreme values of skew (0 and 3) because at high skew values, there are very few "important" values in the relation that must be captured and histograms are able to capture the important values using a small number of buckets. At low skew values, almost all frequencies are identical and one or two buckets are enough. For medium values of skew, there are a sufficient number of distinct frequencies so that the histogram needs more buckets for accurately approximating the distribution.

Figure 11:
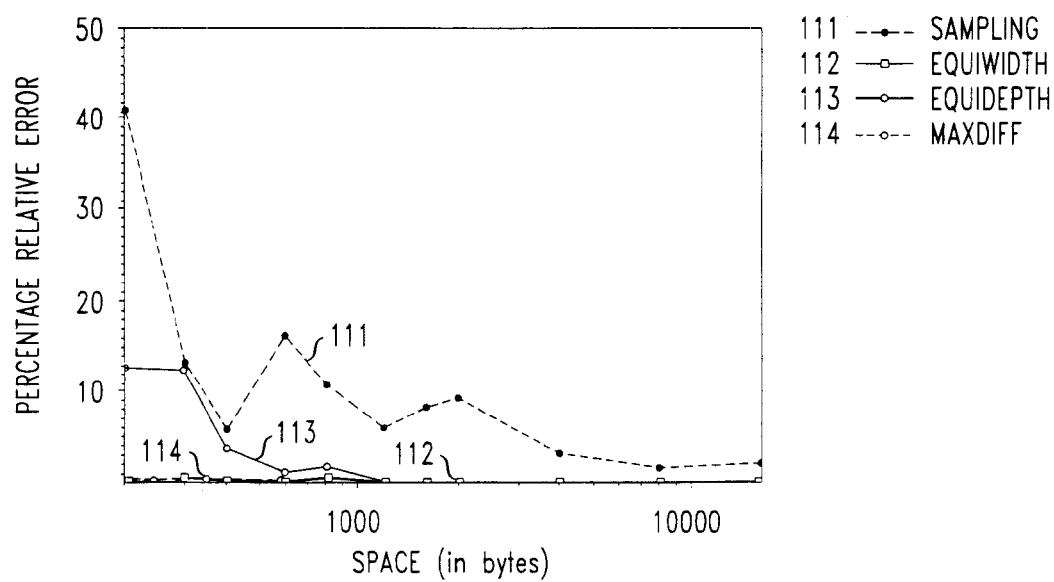
FIG. 11 shows the percentage error on estimating counts as a function of space (in bytes) for range queries.
Figure 12:
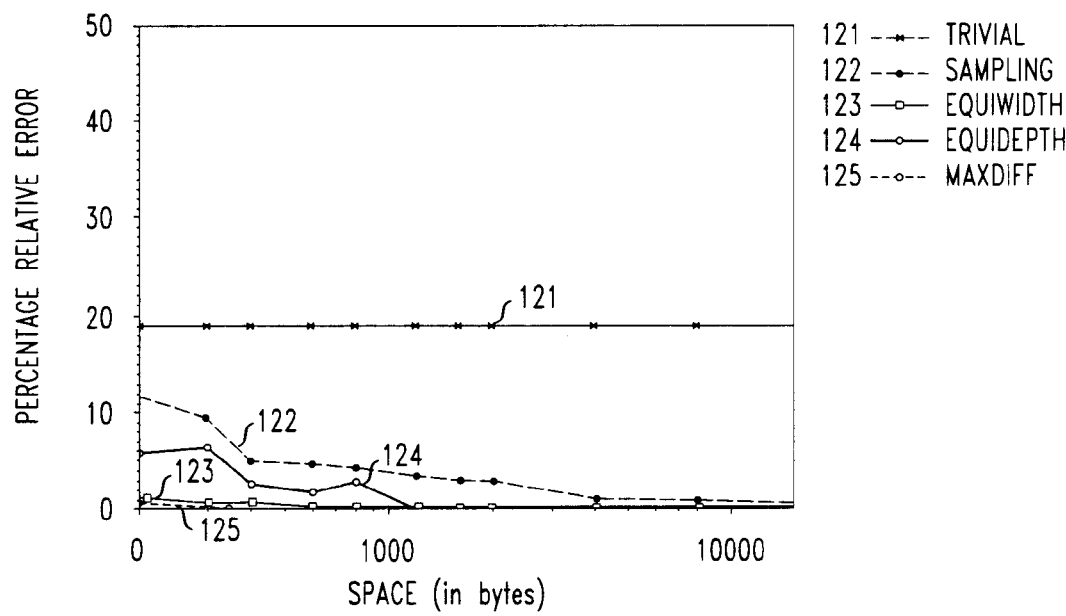
FIG. 12 shows the percentage error on estimating averages as a function of space (in bytes) for range queries.

For aggregate queries, FIG. 11 shows the percentage error on estimating counts as a function of space (in bytes) for range queries, and FIG. 12 shows the percentage error on estimating averages as a function of space (in bytes) for range queries. In FIG. 11, the percentage relative error for Sampling, Equi-Width, Equi-depth and MaxDiff are shown at 111–114, respectively. Also in FIG. 11, the Trivial technique incurred errors in excess of 50% and, consequently, is not shown. In FIG. 12, the percentage relative error for Trivial, Sampling, Equi-Depth, Equi-Width and MaxDiff are shown at 121–125, respectively.

The other techniques had reasonably small errors because the inaccuracies in approximating individual values are often mitigated when those values are aggregated. MaxDiff once again performed well, even for small amounts of space. The relative performance of various techniques is due to their effectiveness in approximating the entire relation accurately. Most techniques estimate average far more accurately than count. This fact, which is well known in statistical literature, was observed in all test runs.

Figure 13:
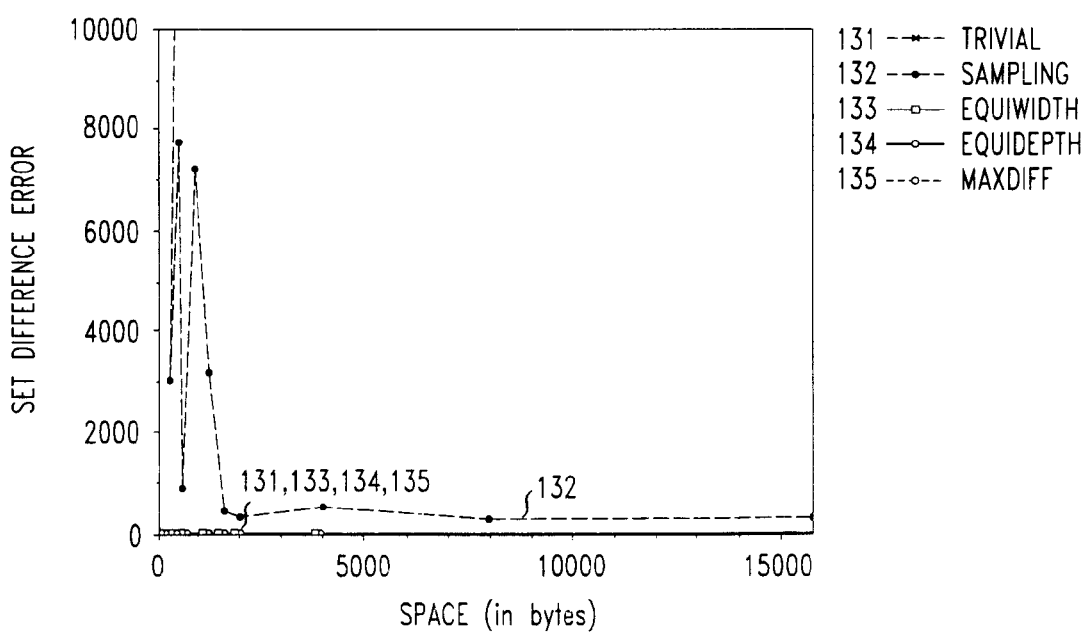
FIG. 13 shows the set difference errors in estimating the distinct values in attributes with a Uniform distribution as a function of space for projections.

The estimation of projections depends solely on the value domains of the attributes. Hence, the performance of various techniques are compared for two different value distributions: Uniform and Cusp-Max. For Non-Aggregate Queries, FIGS. 13 and 14 respectively show the errors in estimating the distinct values in attributes with Uniform and Cusp-Max distributions as a function of space. In FIG. 13, the set difference error for Trivial, Sampling, Equi-Width, Equi-Depth and MaxDiff are shown at 131–135, respectively. All histogram techniques, including Trivial, performed well for the Uniform distribution because the uniform spread assumption is perfectly accurate when the value domain is uniform, regardless of the groupings.

Figure 14:
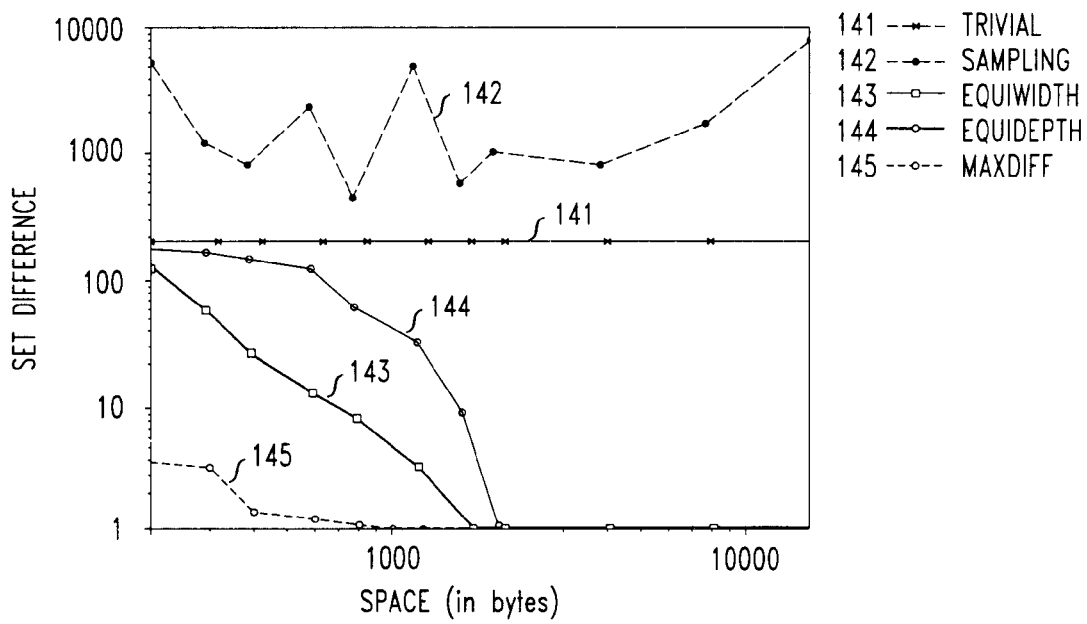
FIG. 14 shows the set difference errors in estimating the distinct values in attributes with a Cusp-Max distribution as a function of space for projections.

In FIG. 14, the set difference errors for Trivial, Sampling, Equi-Width, Equi-Depth and MaxDiff are shown at 141–145, respectively. For the Cusp-Max distribution, the more complex histogram techniques, particularly MaxDiff, performed better than Trivial because MaxDiff formed buckets so that the skew in the value domain did not significantly impact the uniform spread assumption. Most noticeably, Sampling performed poorly for projection result estimation. For background regarding projection result estimation, see, for example, P. J. Haas et al., Sampling-based estimation of the number of distinct values of an attribute, Proc. of the 21st Int. Conf on Very Large Databases, pp. 311–322, 1995; and J. F. Naughton et al., On estimating the size of projections, Technical Report 1021, University of Wisconsin-Madison, 1991, which are each incorporated by reference herein. This is particularly true for the Cusp-Max case because Sampling may completely miss values that are far from others, a concept that is penalized in the dissimilarity metric of the present invention (Eq. (1)). The jagged pattern in Sampling errors occurred because the errors depend significantly on the specific values that are sampled, which can vary from sample to sample.

Figure 15:
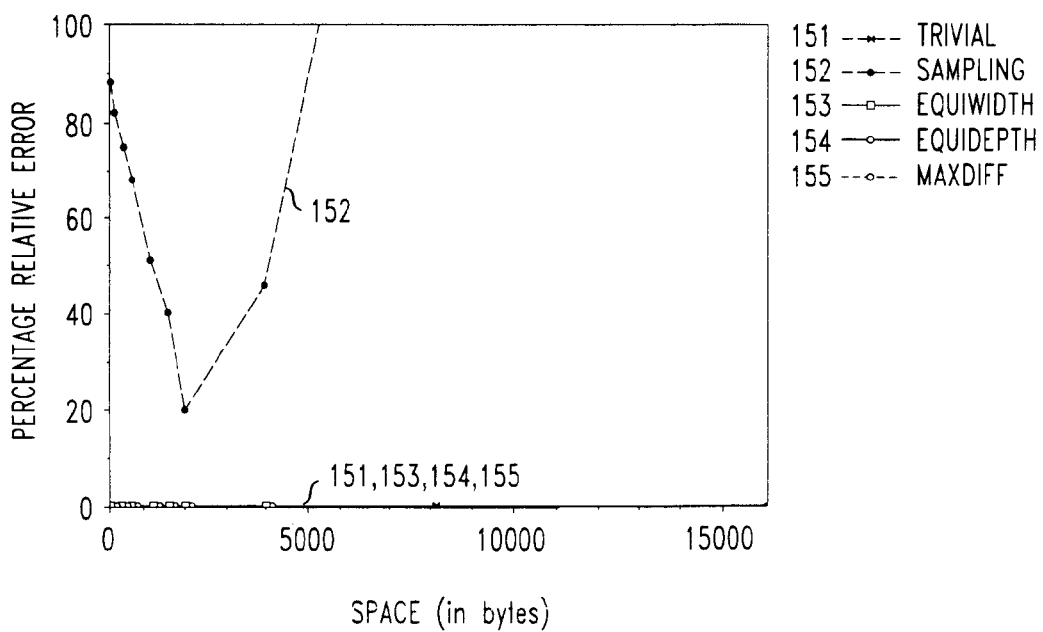
FIG. 15 shows the percentage relative errors in estimating count for the Cusp-Max distribution as a function of space.
Figure 16:
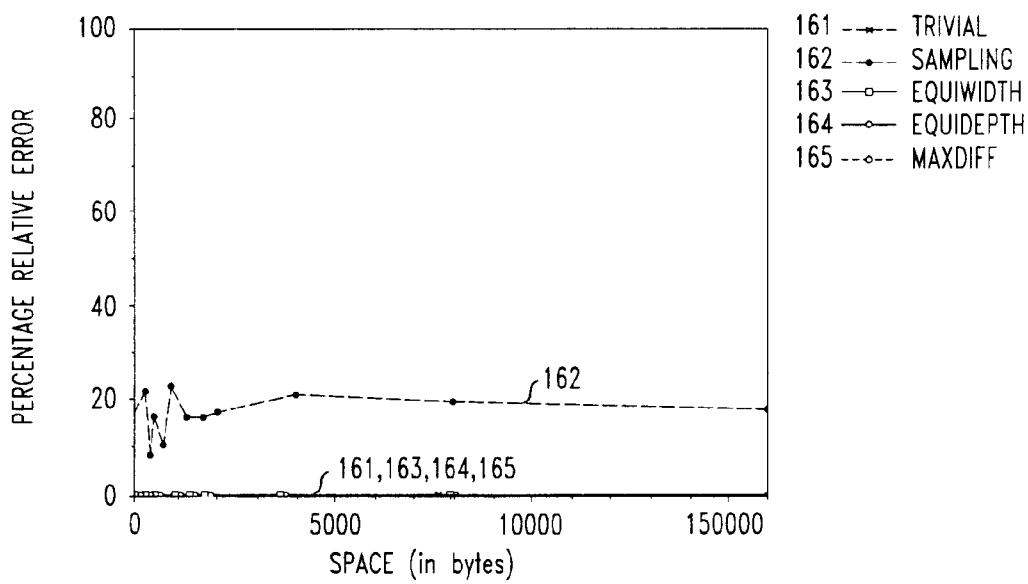
FIG. 16 shows the percentage relative errors in estimating average for the Cusp-Max distribution as a function of space for projections.

For aggregate queries, FIGS. 15 and 16 respectively show the errors in estimating count and average for the Cusp-Max distribution as a function of space. In FIG. 15, the percentage relative errors for estimating counts for Trivial, Sampling, Equi-Width, Equi-Depth and MaxDiff are shown at 151–155, respectively. Histogram techniques performed well for count because the histograms accurately keep the number of distinct values, but Sampling degraded rapidly, as expected. In FIG. 16, the percentage relative error for estimating averages for Trivial, Sampling, Equi-Width, Equi-Depth and MaxDiff are shown at 161–165, respectively. All techniques, including Sampling, however, performed reasonably well for average.

In the final set of error studies, the performance of various techniques were evaluated for approximating the results of complex queries with selection and join operators. The $R_1$ and $R_2$ relations in the SJ-query contained 100,000 and 1000 tuples, respectively, and had 500 distinct values each. The range predicate had a selectivity of 10%. The value distributions of $R_1$ and $R_2$ were both Cusp-Max with $z_f$ of 0.2 and 1, respectively. The frequency distributions of both relations had a skew of $z_f=1.5$.

Figure 17:
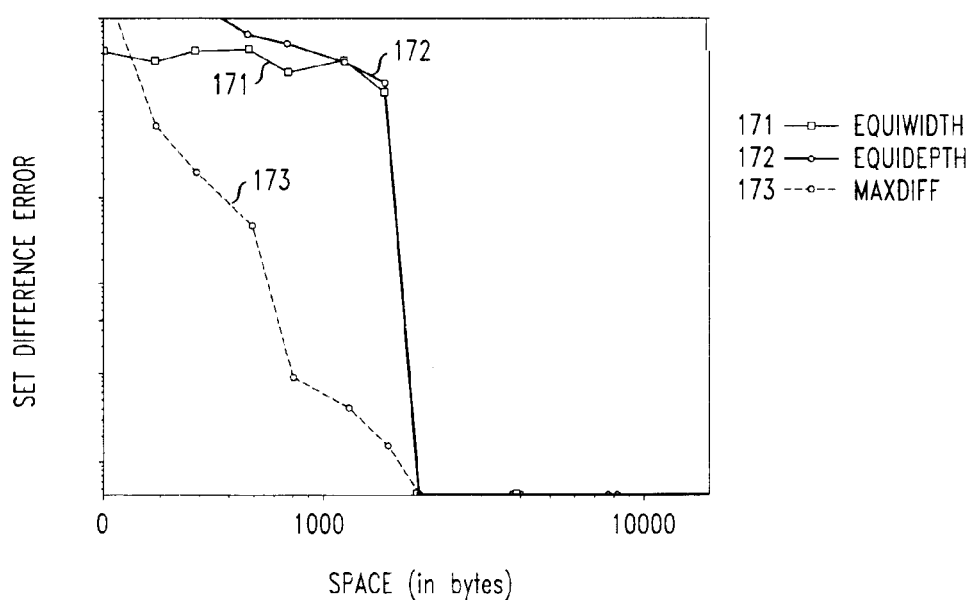
FIG. 17 shows the set difference errors in estimating the result set as a function of space for set join queries.
Figure 18:
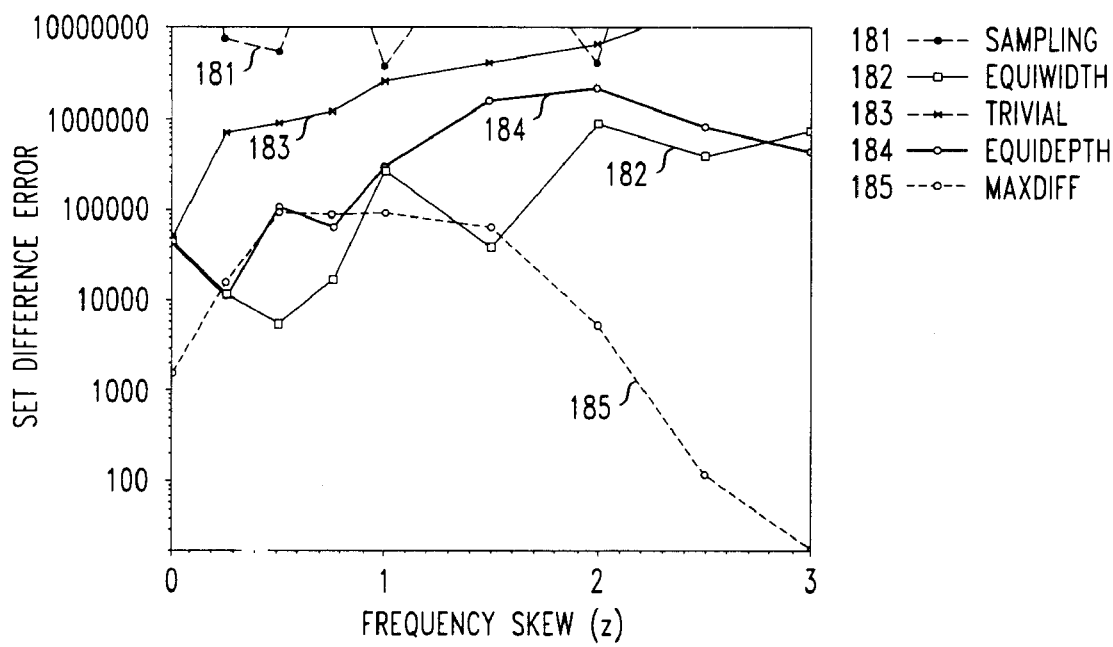
FIG. 18 shows the set difference errors in estimating the result set as a function of frequency skew for set join queries.

For non-aggregate queries, FIG. 17 shows the errors in estimating the result set as a function of space, and FIG. 18 shows the errors in estimating the result set as a function of frequency skew. In FIG. 17, the set difference error for Equi-Width, Equi-Depth and MaxDiff are shown at 171–173. Strangely, Sampling performed significantly worse in this case (worse than even Trivial) and could not be plotted in the graph due to the resulting extremely high errors. The main reason for this is that the join of two samples often contains few or no tuples in the join because the small samples of the two relations are unlikely to contain any common values. In FIG. 18, the set difference error for Sampling, Equi-Width, Trivial, Equi-Depth and MaxDiff are shown at 181–185, respectively. Once again MaxDiff performed extremely well for the SJ-queries as well. The effects of space and frequency skew were identical to those observed for range predicates.

For aggregate queries, the relative performance of the various techniques for the aggregates on SJ-query results were similar to that for range predicates, with the difference that the errors due to Sampling were much higher (often exceeding 50%). Histograms, once again, due to their "holistic" approach to approximation, i.e., approximating the entire data, performed well for the SJ-queries as well (the maximum error was around 15%).

The times taken by various techniques for answering the SJ queries, running on a SUN SPARC machine with 250 MB of memory and more than 10 GB of disk space were measured. Because the time taken by the histogram-based techniques depends solely on the number of buckets, only the times for just one of the histograms (MaxDiff) are presented Table 8.

TABLE 8

| | Space (in bytes) | | | | | | |
|---|---|---|---|---|---|---|---|
| Technique | 50 | 100 | 300 | 500 | 1000 | 2000 | 4000 |
| Sampling | 0.10 | 0.18 | 0.40 | 0.72 | 2.60 | 5.30 | 10.30 |
| Max Diff | 0.56 | 0.82 | 0.96 | 1.32 | 3.20 | 6.10 | 11.19 |

Evaluation of the exact answer for this query took about 248 seconds (averaged over 30 runs). Table 8 sets forth the times for different values of space. Max)iff took slightly more time than Sampling because a join query on histograms requires as many operations as the number of distinct values in the join attributes. Nevertheless, the times were still exceedingly small and were insignificant in comparison to the actual time of execution.

Based on the extensive set of experimental results, the following conclusions about the various techniques are derived. Trivial performed poorly in most cases. Sampling performed satisfactorily only for aggregate queries having no join or projection operators. Among aggregates, Sampling performed well for average and variance, but did poorly for count and sum. Sampling, however, offers probabilistic guarantees on for errors, which are essential in some applications. Furthermore, as new techniques are developed for handling the problem with join queries, sampling is likely to stay as a viable candidate for approximate query answering, at least for aggregate queries.

MaxDiff performed extremely well and was consistently better than the other techniques that were considered. This was observed for different kinds of data sets, query types (aggregate as well as set-valued, with selection, joins, or projections), and for various aggregate operations. Most of the time, the good performance could be traced to the fact that histograms approximate of the entire data well, and MaxDiff, unlike the other histograms considered, captures both frequency and value domain skews effectively.

Figure 19:
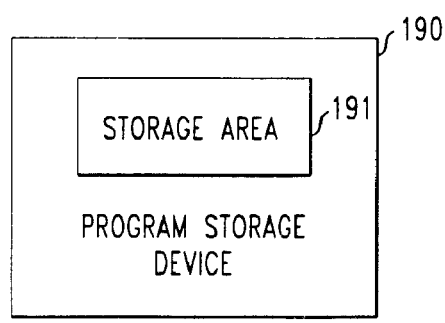
FIG. 19 shows a program storage device having a storage area in which information is stored that tangibly embodies a program of instructions executable by the machine for performing the method of the present invention.

FIG. 19 shows a program storage device 190 having a storage area 191. Information stored in the storage area in a well-known manner that is readable by a machine, and that tangibly embodies a program of instructions executable by the machine for performing the method of the present invention described herein for generating a histogram-based approximate response to a query. Program storage device 190 can be a magnetically recordable medium device, such as a magnetic diskette or hard drive, or an optically recordable medium device, such as an optical disk.

While the present invention has been described in connection with the illustrated embodiments, it will be appreciated and understood that modifications may be made without departing from the true spirit and scope of the invention.

What is claimed is:

1. A method for generating an approximate answer in response to a query to a database, the method comprising steps of:

receiving an SQL query Q for operating on a relation R in a database, relation R having an associated histogram H;

translating the SQL query Q to be a query Q' for operating on histogram H;

executing translated query Q' on histogram H for obtaining a result histogram; and expanding the result histogram into a relation having tuples containing approximate attribute values based at least partially on actual value level or frequency of occurrence.

2. The method according to claim 1, wherein the step of translating the SQL query Q includes steps of:

forming a relational algebra operator tree T that is equivalent to query Q, operator tree T having leaves;

forming a tree T' by replacing each base relation in the leaves of tree T by a corresponding histogram; and generating another histogram by translating each operator into an SQL query that takes at least one histogram as an input based on children of the operator.

3. The method according to claim 2, wherein the relational algebra operator tree T includes at least one of a select operation, a project operation and a join operation.

4. The method according to claim 2, wherein the SQL query Q includes a join operation, and wherein the step of translating the SQL query Q includes step of translating the join operation into a sequence of two queries.

5. The method according to claim 1, wherein the step of expanding the result histogram into the relation having tuples includes a step of expanding each value of histogram H based on a frequency of the value.

6. The method according to claim 1, wherein the histogram H is a MaxDiff histogram.

7. The method according to claim 1, wherein the step of expanding the result histogram into a relation having tuples includes steps of:

generating positions of values of each bucket of histogram H; and computing an approximate value for each bucket using a low value and a spread value for each bucket.

8. A program storage device, comprising:

a storage area, and information stored in the storage area, the information being readable by a machine, and tangibly embodying a program of instructions executable by the machine for performing method steps for generating an approximate answer in response to a query to a database, the method comprising steps of receiving an SQL query Q for operating on a relation R in a database, relation R having an associated histogram H;

translating the SQL query Q to be a query Q' for operating on histogram H;

executing translated query Q' on histogram H for obtaining a result histogram; and expanding the result histogram into a relation having tuples containing approximate attribute values based at least partially on actual value level or frequency of occurrence.

9. The program storage device according to claim 8, wherein the step of translating the SQL query Q includes steps of:

forming a relational algebra operator tree T that is equivalent to query Q, operator tree T having leaves;

forming a tree T' by replacing each base relation in the leaves of tree T by a corresponding histogram; and generating another histogram by translating each operator into an SQL query that takes at least one histogram as an input based on children of the operator.

10. The program storage device according to claim 9, wherein the relational algebra operator tree T includes at least one of a select operation, a project operation and a join operation.

11. The program storage device according to claim 10, wherein the SQL query Q includes a join operation, and wherein the step of translating the SQL query Q includes step of translating the join operation into a sequence of two queries.

12. The program storage device according to claim 8, wherein the step of expanding the result histogram into the relation having tuples includes a step of expanding each value of histogram H based on a frequency of the value.

13. The program storage device according to claim 8, wherein the histogram H is a MaxDiff histogram.

14. The program storage device according to claim 8, wherein the step of expanding the result histogram into a relation having tuples includes steps of:

generating positions of values of each bucket of histogram H; and computing an approximate value for each bucket using a low value and a spread value for each bucket.

* * * * *